US006538702B1

United States Patent
Taketani et al.

(10) Patent No.: US 6,538,702 B1
(45) Date of Patent: Mar. 25, 2003

(54) DIGITAL COLOR SIGNAL REPRODUCING CIRCUIT

(75) Inventors: Nobuo Taketani, Hyogo (JP); Hiroshi Moribe, Osaka (JP); Hisao Morita, Osaka (JP); Ryuichi Shibutani, Osaka (JP); Hiroshi Ando, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 400 days.

(21) Appl. No.: 09/659,834

(22) Filed: Sep. 11, 2000

(30) Foreign Application Priority Data

Sep. 20, 1999 (JP) .......................... 11-265586

(51) Int. Cl.[7] .............................. H04N 9/66
(52) U.S. Cl. ................. 348/638; 348/505; 348/506; 348/508
(58) Field of Search ................. 348/638, 639, 348/640, 641, 663, 667, 668, 557, 678, 679, 644, 645, 653, 654; H04N 9/45, 9/66, 9/455

(56) References Cited

U.S. PATENT DOCUMENTS 5,459,524 A * 10/1995 Cooper ................. 348/507
5,654,768 A * 8/1997 Hatano ................. 348/640
5,926,220 A * 7/1999 Linzer ................. 348/391
6,034,735 A * 3/2000 Senbongi et al. ........... 348/505
6,061,101 A * 5/2000 Takei .................. 348/642
6,064,442 A * 5/2000 Aihara ................. 348/507
6,172,713 B1 * 1/2001 Morita ................. 348/557

FOREIGN PATENT DOCUMENTS

JP         11-8857        1/1999

* cited by examiner

*Primary Examiner*—John Miller
*Assistant Examiner*—Trang U. Tran
(74) *Attorney, Agent, or Firm*—McDermott, Will & Emery (57) ABSTRACT

A color signal reproducing circuit having A/D converter 101, sync separator 102, YC separator 103, gain controller 105, multipliers 106 and 107, low-pass filters 108 and 109, burst-period cumulative adders 110 and 111, SINCOS generator 112, clock generator 113, and ramp-wave generator 114. The simple structure allows a color signal reproducing circuit to be used commonly in a different television systems without changing its clock frequency considerably in accordance with broadcasting systems and also achieves YC separation and color signal demodulation from analog composite signal with a higher degree of precision.

4 Claims, 6 Drawing Sheets

DIGITAL COLOR SIGNAL REPRODUCING CIRCUIT

FIELD OF THE INVENTION

The present invention relates to a digital color signal reproducing circuit for a television receiver capable of receiving television broadcasting based on a different televisions systems, and more particularly to a technique for realizing a color signal reproducing circuit with a simple structure while using the digital color signal reproducing circuit commonly in different televisions systems and for achieving YC separation and demodulation of color signal with a high degree of precision without changing its clock frequency considerably.

BACKGROUND OF THE INVENTION

In recent years, as television receivers come into wide use around world, receiver of different television systems is demanded to be used commonly and higher in performance. For example, a digital color signal reproducing circuit is demanded to be used commonly in the NTSC and PAL systems and higher in performance.

An example of a conventional digital color signal reproducing circuit is described below with reference to FIG. 3.

Figure 3:
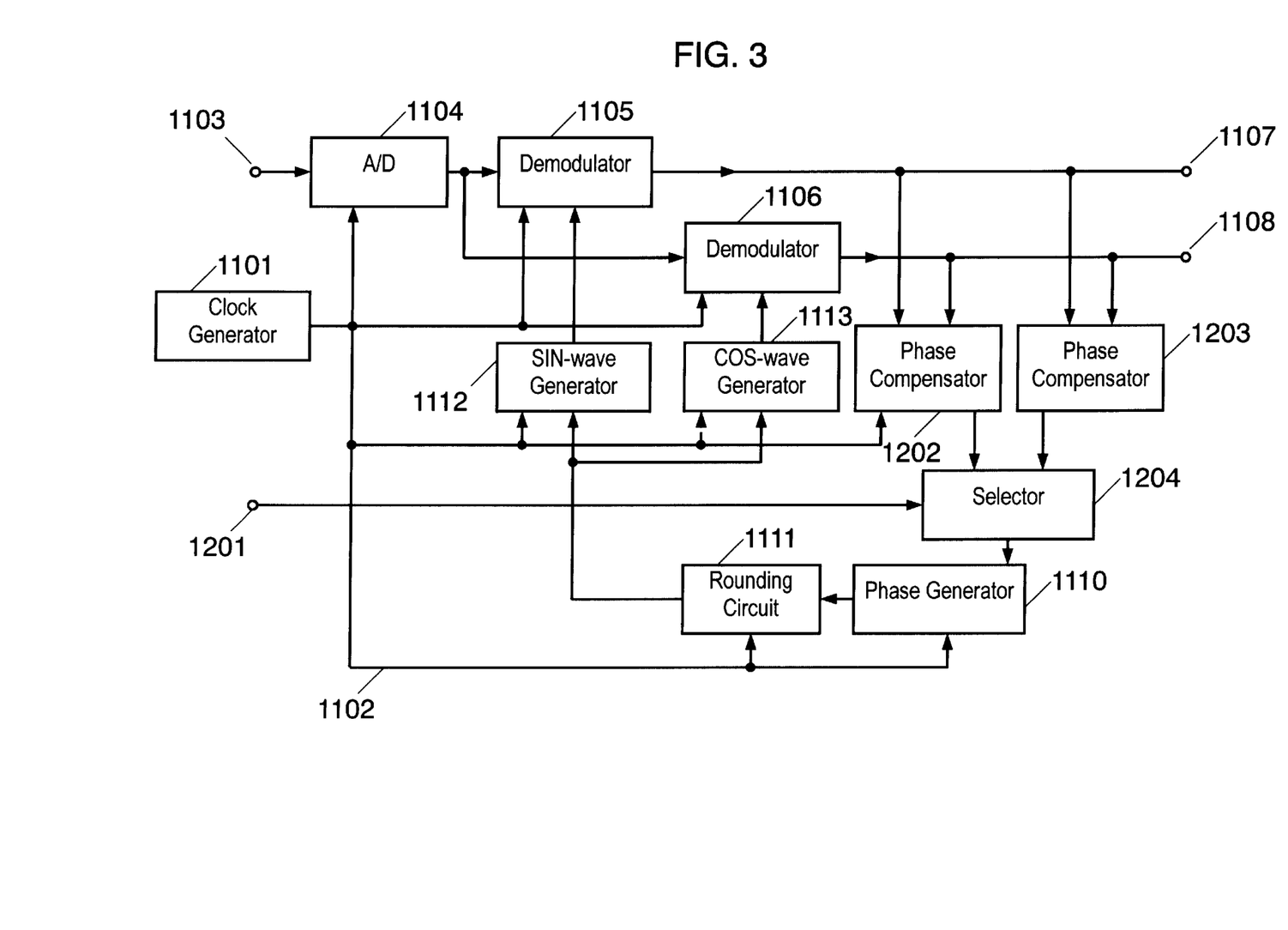
FIG. 3 is a block diagram of a conventional digital color signal reproducing circuit.

FIG. 3 shows a block diagram of the digital color signal reproducing circuit disclosed in Japanese Laid-open Patent H11-8857.

In FIG. 3, clock generator 1101 generates clock pulse 1102 at a frequency of an integral multiple (e.g. 4 times: 27 MHz) of the sampling frequency of color-difference signal, 6.75 MHz. In response to clock pulse 1102, A/D converter 1104 samples analog chrominance subcarrier signal fed from input terminal 1103 and converts it into 8-bit digital data.

First demodulator 1105 multiplies the output from A/D converter 1104 by the output from sine wave generator 1112 at every clock pulse 1102 and thereafter eliminates high frequency components for thinning-out processing. Then, it outputs 6.75-MHz color-difference signal (B-Y signal) from output terminal 1107.

Second demodulator 1106 multiplies the output from A/D converter 1104 by the output from cosine wave generator 1113 at every clock pulse 102 and thereafter eliminates high frequency components for thinning-out processing. Then, it outputs 6.75-MHz color-difference signal (R-Y signal) from output terminal 1108.

NTSC phase compensator 1202 performs mean value processing on color burst (hereinafter abbreviated as "burst") period of output signals from demodulator 1105 and 1106. Then, it detects and outputs the phase differences between reference subcarrier signal and burst signal. PAL phase compensator 1203 performs mean value processing on burst period of output signals from demodulator 1105 and 1106. Then, it detects and outputs the phase difference between reference subcarrier signal and burst signal.

Selector 1204 selects the output from either phase compensator 1202 or 1203 in accordance with NTCS/PAL switching signal.

Phase generator 1110 constitutes a voltage control oscillator (VCO) that changes phase lead quantities per clock pulse. The VCO is controlled by the phase difference supplied from phase compensator 1202 or 1203, and outputs a phase lead quantity per clock pulse.

Rounding circuit 1111 omits the least significant bit of the output from phase generator 1110 to reduce the number of bits (rounding operation) and outputs 10-bit phase information.

Sine wave generator 1112 and cosine wave generator 1113 are composed of a ROM that stores data corresponding to one wavelength of sine wave and one wavelength of cosine wave. Ten-bit data from rounding circuit 1111 is fed into the address line of the ROM. The ROM outputs sine and cosine components of 8-bit reference subcarrier signal to first and second demodulator 1105 and 1106 at every clock cycle.

During the NTSC operation, demodulator 1105 and 1106, phase compensator 1202, selector 1204, phase generator 1110, rounding circuit 1111, sine wave generator 1112, and cosine wave generator 1113 form a loop circuit. This loop circuit operates as an NTSC automatic phase control (hereinafter abbreviated as APC) circuit and always generates reference subcarrier conforming to the normal demodulation axis.

During the PAL operation, demodulator 1105 and 1106, phase compensator 1203, selector 1204, phase generator 1110, rounding circuit 1111, sine wave generator 1112, and cosine wave generator 1113 form a loop circuit. This loop circuit operates as a PAL APC circuit and always generates reference subcarrier conforming to the normal demodulation axis.

As a result, analog chrominance subcarrier signal is demodulated so as to conform to the normal demodulation axes in first and second demodulator 1105 and 1106 and supplied to output terminals 1107 and 1108 as R-Y and B-Y signals.

The above structure is a digital color signal reproducing circuit that converts analog chrominance subcarrier signal into digital signal and thereafter demodulates into color-difference signals. Meanwhile, recent advances in digital technologies have realized a digital color signal reproducing circuit that separates chrominance subcarrier signal from digital composite signal converted from analog composite signal and thereafter demodulates into color-difference signals. Moreover, in this method, reduction of cross-color and dot crawl interference is desired.

However, when color-difference signals are demodulated from digital chrominance subcarrier signal, i.e. the output from the YC separator, using the conventional color signal reproducing circuit, there are the following problems.

Since the clock pulse do not lock to the burst signal and horizontal synchronizing signal of composite signal, three-dimensional YC separation is not performed accurately and thus some interference remains.

In sophisticated three-dimensional YC separation for the NTSC system, high line correlation and frame correlation in chrominance components are utilized. For this reason, inter-frame and inter-line signals can accurately be added or subtracted, only when clock pulse lock to the burst signal and have a frequency equal to an integral multiple of that of burst signal.

In addition, in the PAL system, the use of clock pulse locking to burst signal facilitates YC separation using line memory.

In the conventional example, when the clock frequency is selected as an integral multiple of the chrominance subcarrier frequency in order to allow the clock pulse to lock to the burst signal, clock frequencies differ considerably with systems. For example, with the PAL system, the clock frequency is 4.43 MHz×4=17.72 MHz; and with the NTSC system, the clock frequency is 3.58 MHz×4=14.32 MHz.

Figure 6:
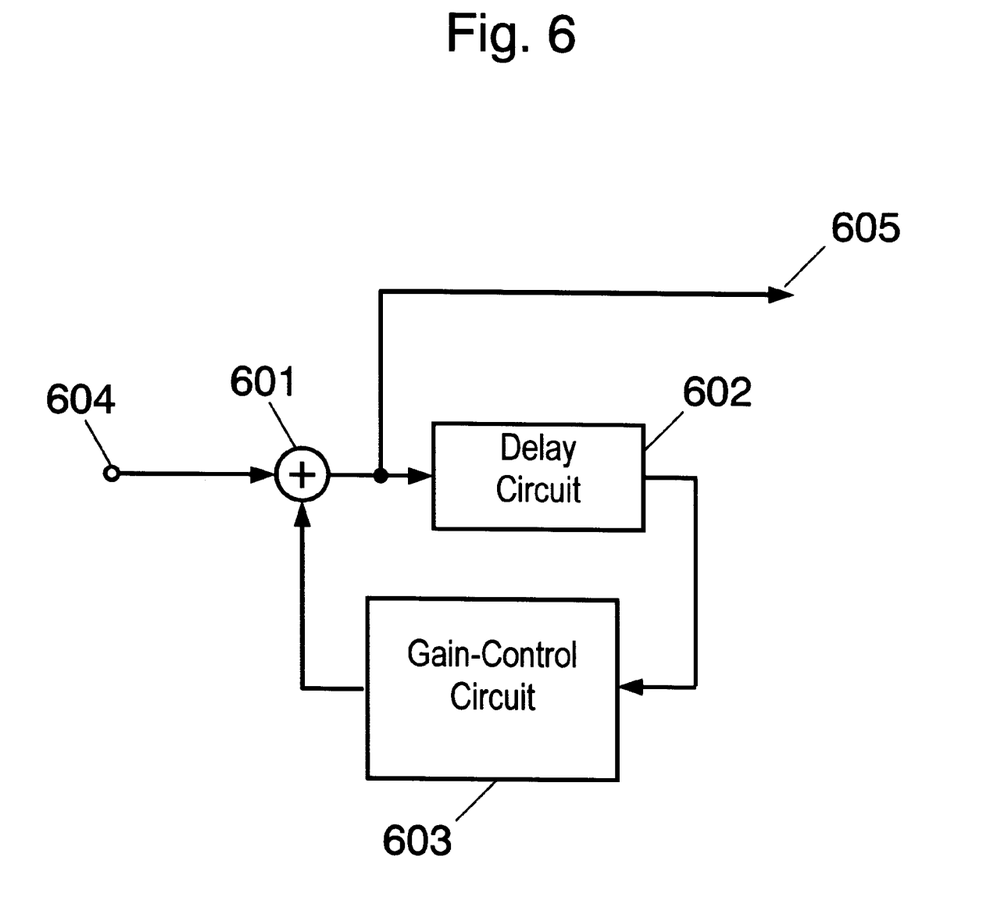
FIG. 6 is a block diagram of a recursive digital filter used in the embodiments and conventional example of the present invention.

FIG. 6 shows a block diagram of a recursive digital filter. Such a recursive digital filter is used for a low-pass filter, YC separator, sync separator and other circuits in a color signal reproducing circuit. In FIG. 6, the recursive digital filter is composed of adder 601, delay circuit 602 that delays input signal by n clock pluses, and gain controller 603 that controls the amplitude of input signal and outputs the controlled signal.

When the clock frequency is changed in accordance with the systems, the characteristic of the recursive digital filter change with the clock frequency, so gain coefficient of gain controller 603 must be changed in accordance with the systems. This poses a problem that more complicated circuit is necessitated. To solve the problem, circuit that allows the clock frequency to be set to an any multiple of the chrominance subcarrier frequency is desired.

SUMMARY OF THE INVENTION

To solve the problem, a digital color signal reproducing circuit of the present invention has:

- an A/D converter that samples analog composite signal using a sampling clock and converts them into digital composite signal;
- a YC separator that separates luminance signals and chrominance subcarrier signal from the digital composite signal and outputs respective signals;
- a gain controller that controls the amplitude of the chrominance subcarrier signal and outputs the controlled signal;
- a first multiplier that multiplies output signal of the gain controller by sine component of reference subcarrier signal and outputs R-Y color-difference signal together with its high frequency components;
- a second multiplier that multiplies output signal of the gain controller by cosine component of the reference subcarrier signal and outputs B-Y color-difference signal together with its high frequency components;
- a burst-period cumulative adder that outputs phase difference signal obtained by extracting signal within burst gate pulse period from the output signals of the first multiplier and cumulating them;
- a clock generator that controls clock frequency in accordance with the phase difference signal and outputs clock pulse locking to burst signal; and
- a reference subcarrier generator that receives the output signal of the clock generator and a control signal as input and that controls the frequency of its output signal in accordance with the control signal and outputs the sine and cosine components of the reference subcarrier signal to the multipliers.

The frequency of the reference subcarrier is controlled by the control signal in accordance with the broadcasting systems and the clock is used as the sampling clock for the A/D converter.

In accordance with the present invention, in television receiver capable of receiving a televisions broadcasting based on different television systems a digital color signal reproducing circuit realizes a simple structure while using it commonly in different television systems without changing its clock frequencies considerably. It is also characterized by the effect of achieving YC separation and demodulation of color signal with a higher degree of precision. With the digital color signal reproducing circuit, its clock frequency can be set to any multiple of the chrominance subcarrier frequency using a reference subcarrier generator capable of controlling the frequency of the reference subcarrier signal in accordance with the control signal.

DESCRIPTION OF THE PREFERRED EMBODIMENTS

A first exemplary embodiment of the present invention is demonstrated below with reference to the accompanying drawings.

Exemplary Embodiment 1

Figure 1:
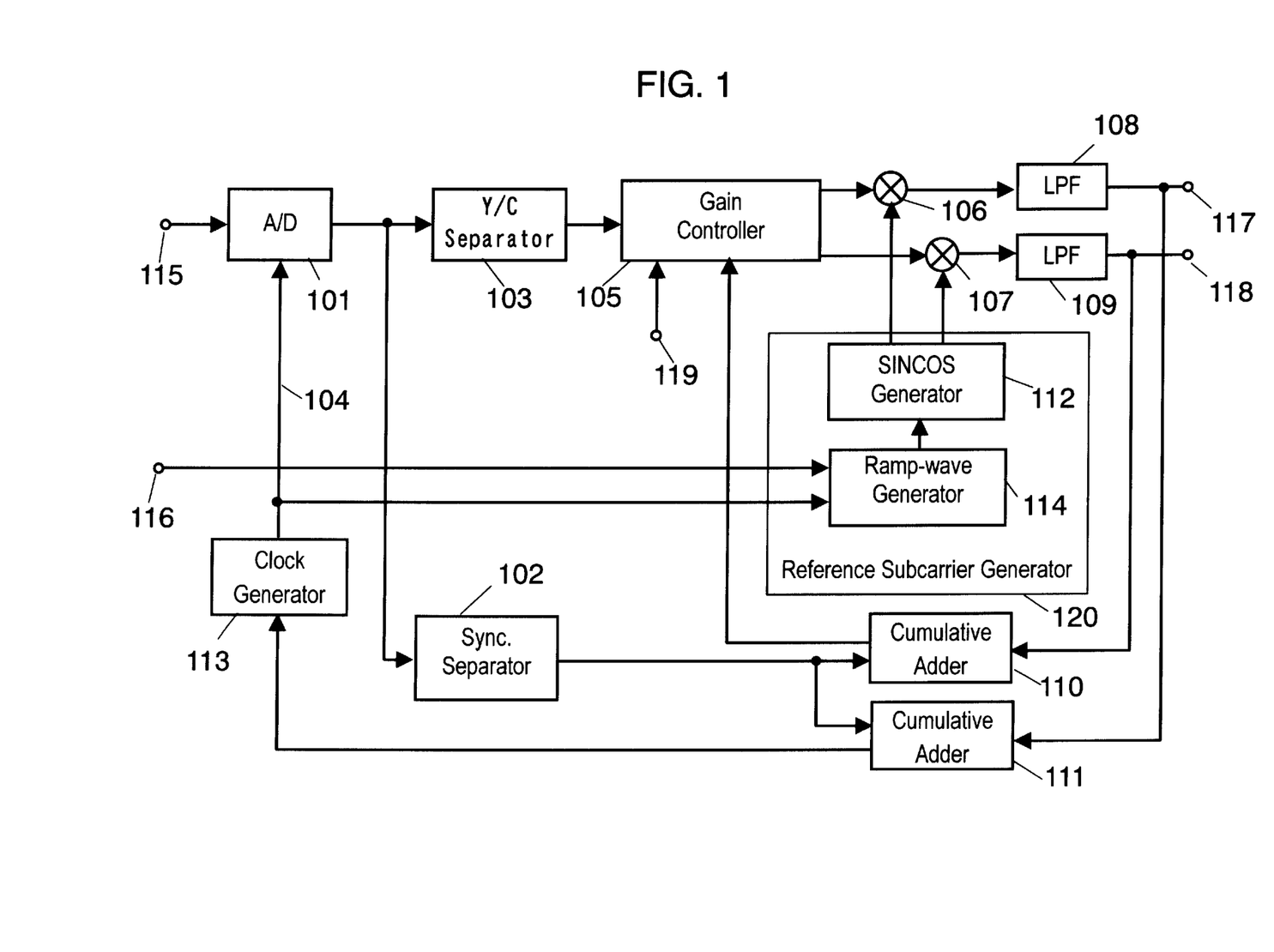
FIG. 1 is a block diagram of a digital color signal reproducing circuit in accordance with a first exemplary embodiment of the present invention.

FIG. 1 is a block diagram showing a digital color signal reproducing circuit in accordance with the first embodiment of the present invention. The digital color signal reproducing circuit supports television broadcasting based on the NTSC and PAL systems.

In FIG. 1, A/D converter 101 samples analog composite signal in response to clock pulse 104, converts it into digital composite signal, and supplies output signal.

Sync separator 102 separates synchronizing signal from the output signal of A/D converter 101 and also outputs burst gate pulse for extracting burst signal. YC separator 103 separates from the output signal of A/D converter 101 luminance signal (hereinafter abbreviated as "Y signal") and chrominance subcarrier signal (hereinafter abbreviated as "C signal") and outputs respective signals. Gain controller 105 controls the amplitude of supplied C signal and outputs the controlled signal.

First multiplier 106 multiplies the output signal of gain controller 105 by the sine output signal of reference subcarrier generator 120 at every clock pulse 104 and thereby outputs color-difference signal (R-Y signal) together with its high frequency components. Second multiplier 107 multiplies the output signal of gain controller 105 by the cosine output signal of the reference subcarrier generator 120 at every clock pulse 104 and thereby outputs color-difference signal (B-Y signal) together with its high frequency components. First low-pass filter hereinafter abbreviated as LPF) 108 eliminates the high frequency components from the output signal of multiplier 106. Second low-pass filter (hereinafter abbreviated as LPF) 109 eliminates the high frequency components from the output signal of multiplier 107.

First burst-period cumulative adder 110 outputs time-varying amplitude of bust signal obtained from the output signal of LPF 109 by the cumulation of the signal within bust gate pulse period. Amplitude-difference signal showing the difference between this output and reference signal 119 set to a predetermined value control the gain of gain controller 105.

Second burst-period cumulative adder 111 outputs time-varying phase difference signal (showing phase difference between burst signal and sine wave from reference subcarrier generator 120) obtained from the output signal of LPF 109 by the extraction and cumulation of the signal within the bust gate pulse period. Clock generator 113 is a voltage control oscillator (hereinafter abbreviated as VCO) and capable of controlling clock frequency in accordance with the level of the output signal of burst-period cumulative adder 111.

Reference subcarrier generator 120 receives clock pulse 104 and control signal 116 as input, generates reference subcarrier signal in accordance with clock pulse 104, and supplies sine and cosine wave components of the reference subcarrier signal to multiplier 106 and 107. The frequency of the reference subcarrier is controlled by control signal 116. The control signal has two kind of data. One for receiving data based on the NTSC system and the other for receiving data based on the PAL system. When NTSC-based data is received, the control signal for receiving NTSC-based data allow the reference subcarrier frequency to be set to 3.579545 MHz and the clock frequency to 28.636 MHz (8 times the chrominance subcarrier frequency), for example. When PAL-based data is received, the control signals for receiving PAL-based data allow the reference subcarrier frequency to be set to 4.43 MHz and the clock frequency to 8.625 MHz (the value nearest to the clock frequency when NTSC-based data is received). In other words, the reference subcarrier frequency differs considerably with broadcasting systems but the clock frequency does not.

Its operation is described below.

In FIG. 1, composite signal fed into terminal 115 is converted into digital signal by A/D converter 101. The converted signal is fed into sync separator 102 and YC separator 103. C signal supplied from YC separator 103 is fed into gain controller 105.

The loop circuit composed of gain controller 105, multiplier 107, LPF 109, and burst-period cumulative adder 110 is an automatic chroma control (hereinafter abbreviated as ACC) circuit. The ACC circuit operates so as to maintain reference signal 119 set to a predetermined value and the output signal of burst-period cumulative adder 110 to the same level. As a result, the level of the C signal supplied from gain controller 105 is kept constant.

The loop circuit composed of multiplier 106, LPF 108, burst-period cumulative adder 111, clock generator 113, and reference subcarrier generator 120 is an auto phase control (hereinafter abbreviated as APC) circuit. The APC circuit operates so as to conform the frequency of the sine and cosine waves supplied from reference subcarrier generator 120 to those of the chrominance subcarrier.

The operation of the APC circuit is more detailed below.

Multiplier 106 multiplies the C signal supplied from gain controller 105 by the sine wave supplied from reference subcarrier generator 120 and thereby supplies phase difference signal of R-Y signal and burst signal, together with its high frequency components. The output signal from multiplier 106 is fed into LPF 108. LPF 108 eliminates the high frequency components and outputs filtered signal. Burst-period cumulative adder 111 supplies to clock generator 113 phase difference signal, i.e. signal obtained from the filtered signal by the extraction of those within the burst period in response to burst gate pulse.

Clock generator 113 controls the frequency of clock pulse 104 in accordance with the phase difference. Clock pulse 104 is fed into reference subcarrier generator 120. In response to clock pulse 104, reference subcarrier generator 120 generates the sine wave of the reference subcarrier based on the broadcasting system set by control signal 116 and supplies them to multiplier 106. The APC circuit of such a loop circuit structure allows clock pulse 104 to lock to burst signal. Clock pulse 104 is supplied to A/D converter 101 and reference subcarrier generator 120. Clock pulse 104 is also supplied to other circuits (not shown in FIG. 1).

As hereinabove described in this embodiment, with the structure in which control signal 116 allow the frequency of sine or cosine waves fed into multiplier 106 or 107 to be changed, the ACC and APC circuits can be arranged without changing the clock frequency considerably. This structure not only allows a color signal reproducing circuit to be used commonly in the NTSC and PAL system but also achieves YC separation and demodulation of chrominance subcarrier signal with a higher degree of precision.

When a three-dimensional YC separation circuit is introduced in a color signal reproducing circuit for the NTSC system, clock pulse locking to burst signal and having a frequency that is an integral multiple of the chrominance subcarrier frequency is necessary because the YC separator utilizes line correlation of chrominance components. Therefore, it is possible to select the clock frequency for NTSC system as an integral multiple of the chrominance subcarrier frequency for NTSC system and select the clock frequency for PAL system as any multiple of the chrominance subcarrier frequency for PAL system.

Exemplary Embodiment 2

Next, the second embodiment of the present invention is described. The block diagram of the digital color signal reproducing circuit of this embodiment is similar to that of the first embodiment shown in FIG. 1.

In FIG. 1, reference subcarrier generator 120 can be made of ramp-wave generator 114 and SINCOS generator 112. Ramp-wave generator 114 receives clock pulse 104 and control signal 116 as input, synchronizes to clock pulse 104, and generates and outputs ramp wave having a frequency equal to the reference subcarrier frequency. The frequency of the ramp wave can be changed with control signal. Therefore, even when reference subcarrier frequency differs with systems, the frequency of the ramp wave can be set to a value appropriate for the system without changing the clock frequency considerably.

SINCOS generator 112 builds in a ROM that stores data corresponding to one wavelength of sine wave and one wavelength of cosine wave. The SINCOS generator reads out the data of the built-in ROM with the addresses of ramp waveform and outputs sine and cosine wave.

Figure 4A:
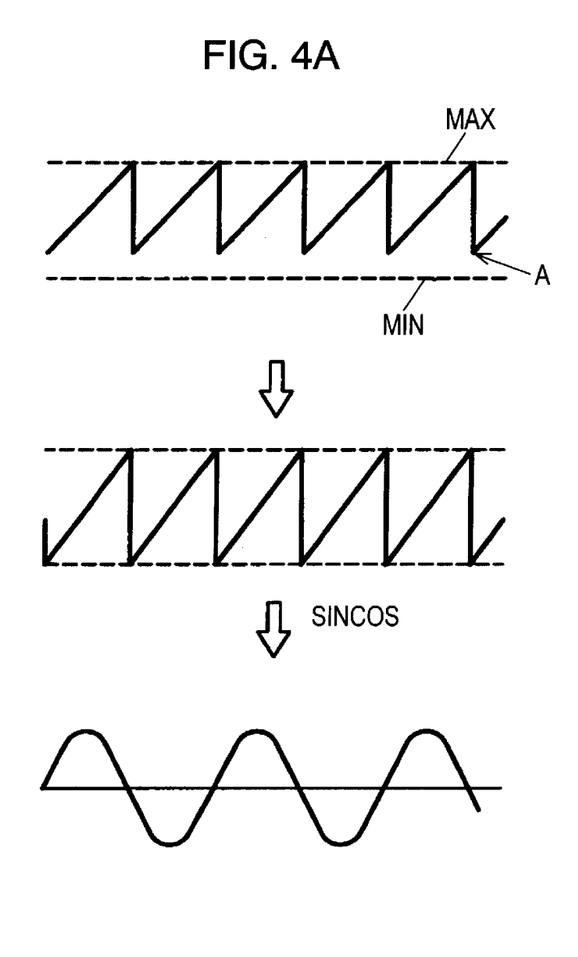
FIGS. 4A and 4B illustrate the operation of a ramp-wave generator of the present invention.
Figure 4B:
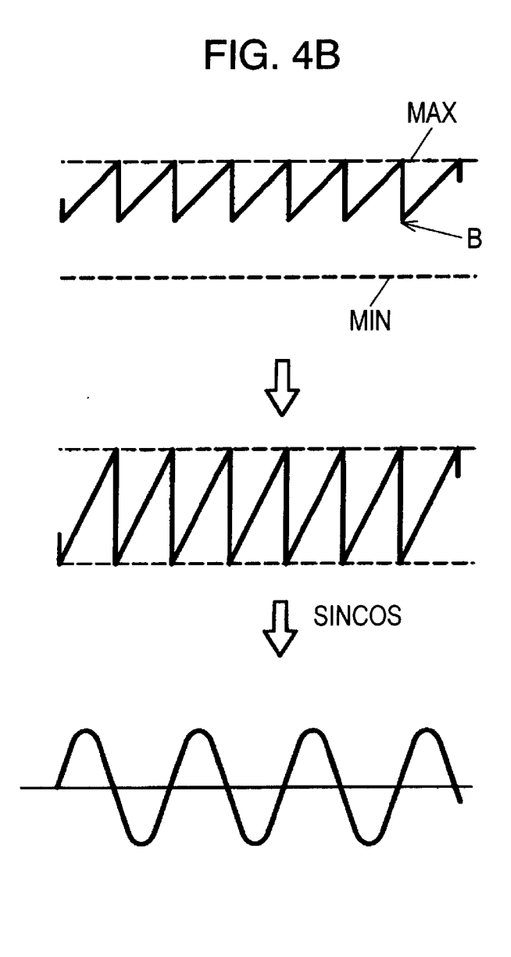

Next, referring to FIGS. 4A and 4B, the operation of ramp-wave generator 114 is described.

FIGS. 4A and 4B shows waveforms used to explain the operation of ramp-wave generator 114.

When control signal 116 is set to a predetermined value "A", ramp-wave generator 114 continues to operate so that it repeatedly adds up "A" at every clock pulse using "A" as a reference value and returns to the reference value "A" when the sum reaches the MAX value.

In the waveform shown in the upper part of FIG. 4A, the MAX value is the maximum value that the ramp waveform can have. Ramp-wave generator 114 can change the frequency of the ramp wave in accordance with control signal 116. The waveform shown in the upper part of FIG. 4A is the one generated when control signal 116 is set to a value "A".

As a result, the waveform shown in the upper part of FIG. 4A is obtained. When this waveform is divided by a predetermined large value, a ramp waveform substantially normalized within a certain preset amplitude range is obtained as shown in the middle part of FIG. 4A. This waveform is supplied to the SINCOS circuit as address data.

Next, FIG. 4B shows waveforms ramp-wave generator 114 outputs when control signal 116 is set to a value "B" larger than "A".

When control signal 116 is set to a larger value, the difference between "B" and the MAX value is smaller and thus the time taken to reach the MAX value is shorter. As a result, the cycle of the ramp waveform becomes shorter as shown in the upper part of FIG. 4B. When this waveform is divided by a predetermined large value, a ramp waveform substantially normalized within a certain preset amplitude range is supplied as shown in the middle part of FIG. 4B. This waveform is supplied to SINCOS generator 112 and the waveform shown in the lower part of FIG. 4B is obtained. This waveform is supplied to multipliers 106 and 107.

Figure 5A:
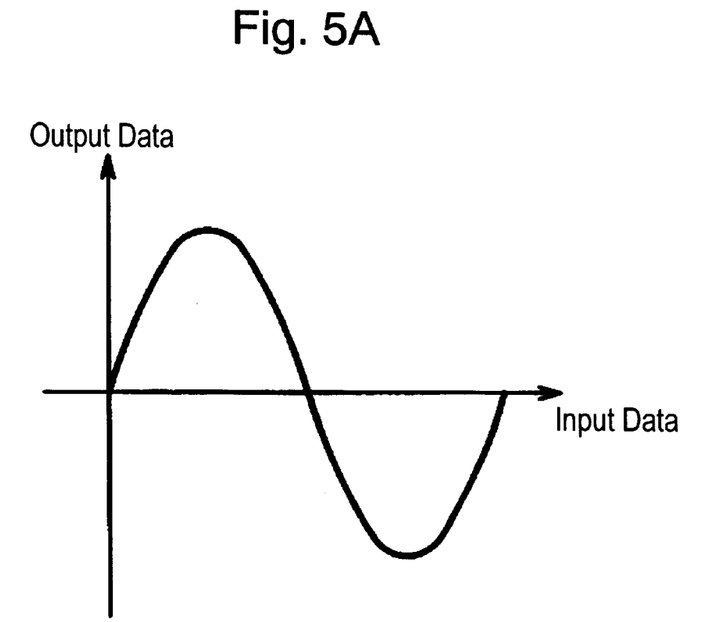
FIGS. 5A and 5B are input-output plots to illustrate the operation of a SINCOS generator of the present invention.
Figure 5B:
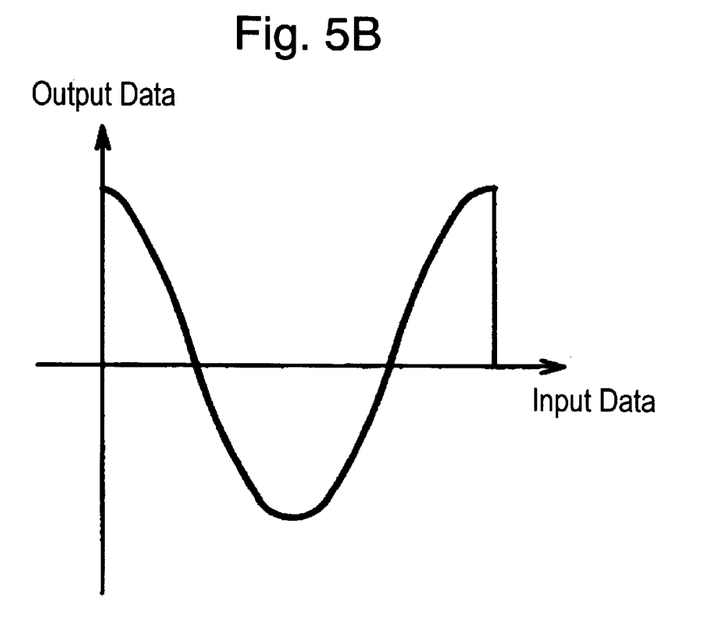

Next, referring to FIGS. 5A and 6B, the operation of SINCOS generator 112 is described.

FIGS. 5A and 5B show input-output plots used to explain the operation of SINCOS generator 112.

SINCOS generator 112 includes ROM data with the input-output relations shown in FIGS. 5A and 5B.

For example, when the ramp data shown in the middle part of FIG. 4A is fed into the ROM with the input-output relations shown in FIGS. 5A and 5B, sine wave and cosine wave are supplied. The sine wave is supplied to multiplier 106 and the cosine wave to multiplier 107.

Sine and cosine waves can also be generated using a SINCOS generator including a simple arithmetic circuit and a ROM that stores data corresponding to a ¼ wavelength of sine wave.

As hereinabove described in this embodiment, with the structure in which control signal 116 allows the frequencies of sine and cosine waves fed into multiplier 106 and 107 to be changed, the ACC and APC circuits can be arranged without changing the clock frequency considerably. This structure not only allows a color signal reproducing circuit to be used commonly in the NTSC and PAL systems but also achieves YC separation and demodulation of chrominance subcarrier signal with a higher degree of precision.

Exemplary Embodiment 3

Next, a third embodiment of the present invention is described. The description of the components common to the first and second embodiments is omitted.

Figure 2:
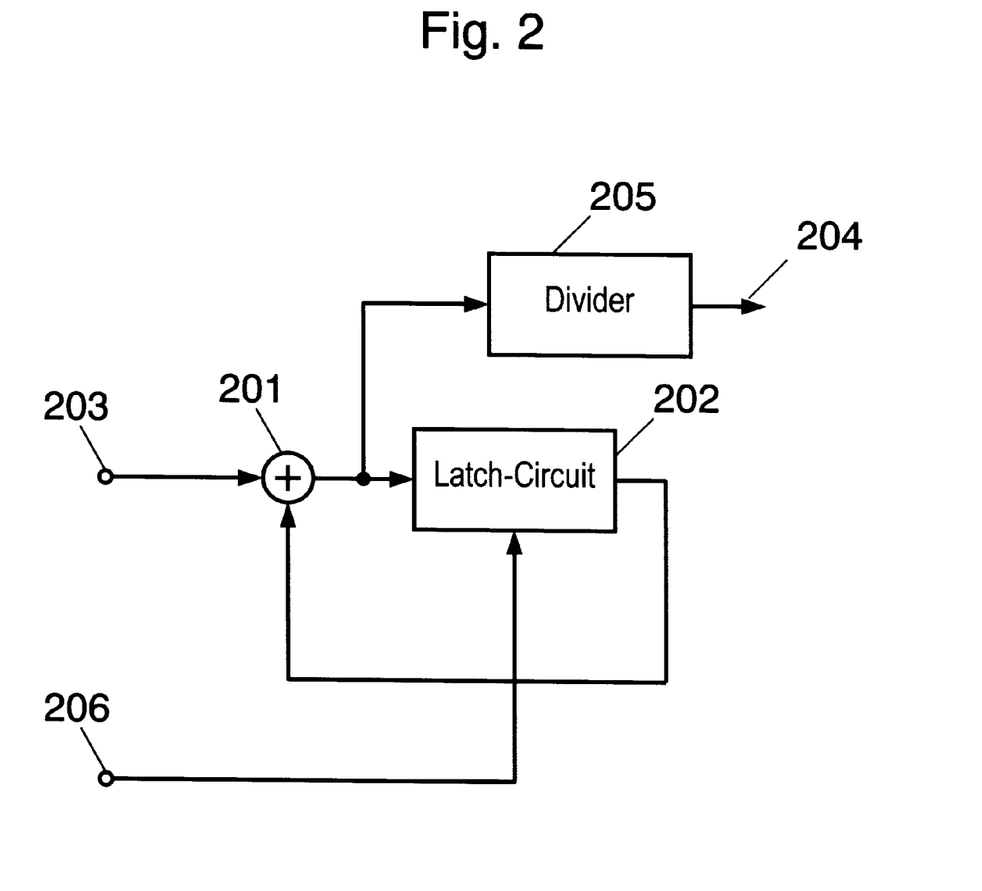
FIG. 2 is a block diagram of a ramp-wave generator in accordance with a third exemplary embodiment of the present invention.

FIG. 2 shows a block diagram of a ramp-wave generator of the present invention.

In FIG. 2, adder 201 adds up control signal 203 and the output signal of latch circuit 202, and outputs the sum to divider 205 and latch circuit 202. Latch circuit 202 latches the output signal of adder 201 in response to clock pulse 206. The loop circuit composed of latch circuit 202 and adder 201 forms a counter circuit. Divider 205 divides the output signal of adder 201 and outputs ramp waveform 204.

Referring to FIG. 2, the operation is described below.

When control signal 203 is set to a predetermined value "A", the counter circuit repeatedly adds up a value "A" on every rising edge of clock pulse 206 using "A" as a reference value. Adder 201 does not perform carry-over operation. Therefore, when the output data from adder 201 reaches the maximum value (e.g. when adder 201 is 10-bit, the maximum value is 1023), data "A" that has the same value as control signal 203 will be supplied at the next clock pulse.

In other words, the output signal from adder 201 provides a waveform shown in the upper part of FIG. 4A. When this waveform is fed into divider 205 and divided by a predetermined large value (specifically, only significant bits of the data from adder 201 are supplied), ramp waveform output signal 204 will provide a normalized ramp waveform as shown in the middle part of FIG. 4A.

When output signal 204 is fed into SINCOS generator 112, its output signal provides a waveform shown in the lower part of FIG. 4A. Through such a process, the frequency of sine wave can be changed with control signal 203.

As hereinabove described, a color signal reproducing circuit of the present invention allows clock pulse to always lock to burst signal even when data based on different systems are received and prevents clock frequency from differing considerably with systems. In other words, the simple system configuration allows a color signal reproducing circuit to be used commonly in different televisions systems and achieves YC separation and color demodulation with a higher degree of precision.

What is claimed is:

1. A digital color signal reproducing circuit comprising:
   an A/D converter that samples an analog composite signal using a sampling clock and converts said analog composite signal into a digital composite signal;
   a YC separator that separates a luminance signal and a chrominance subcarrier signal from said digital composite signal;
   a gain controller that controls the amplitude of said chrominance subcarrier signal and supplies output signal;
   a first multiplier that multiplies said output signal of said gain controller by sine component of a reference subcarrier signal and outputs a color-difference signal (R-Y signal) together with high frequency components thereof;
   a second multiplier that multiplies said output signal of said gain controller by cosine component of said reference subcarrier signal and outputs a color-difference signal (B-Y signal) together with high frequency components thereof;
   a burst-period cumulative adder that extracts signal within burst gate pulse period from the output signal of said first multiplier, cumulates the extracted signal, and supplies output signal;
   a clock generator that controls a clock frequency in accordance with output of said burst-period cumulative adder and outputs a clock pulse locking to a burst signal; and
   a reference subcarrier generator that receives said clock pulse and a control signal as input and that controls frequency of output signal thereof in accordance with said control signal and outputs said sine and cosine components of said reference subcarrier signal;
   wherein frequency of said reference subcarrier signal is controlled in accordance with broadcasting systems by said control signal,
   wherein said clock is used as said sampling clock.

2. A digital color signal reproducing circuit comprising:
   an A/D converter that samples an analog composite signal using a sampling clock and converts said analog composite signal into a digital composite signal;
   a sync separator that separates a synchronizing signal from said digital composite signal and outputs a burst gate pulse for gating a burst signal;
   a YC separator that separates a luminance signal and a chrominance subcarrier signal from said digital composite signal;

a gain controller that controls the amplitude of said chrominance subcarrier signal and supplies output signal;

a first multiplier that multiplies said output signal of said gain controller by sine component of reference subcarrier signal and outputs a color-difference signal (R-Y signal) together with high frequency components thereof;

a second multiplier that multiplies said output signal of said gain controller by cosine component of said reference subcarrier signal and outputs a color-difference signal (B-Y signal) together with high frequency components thereof;

a first low-pass filter that eliminates high frequency components from output signal of said first multiplier;

a second low-pass filter that eliminates high frequency components from output signal of said second multiplier;

a first burst-period cumulative adder that extracts signal within burst gate pulse period from output signal of said first low-pass filter, cumulates the extracted signals, and supplies output signal;

a second burst-period cumulative adder that extracts signal within said burst gate pulse period from output signal of said second low-pass filter, cumulates the extracted signal, and supplies output signal;

a clock generator that a controls clock frequency in accordance with output of said second burst-period cumulative adder and outputs a clock pulse locking to a burst signal;

a ramp-wave generator that receives said clock pulse and control signal as input and generates ramp wave synchronized to said clock pulse, and that can change frequency of said ramp wave in accordance with said control signal; and a SINCOS generator that receives said ramp wave from said ramp-wave generator as address data, reads out built-in ROM data, and outputs said sine and cosine waves;

wherein said gain controller controls the amplitude of said chrominance subcarrier signal in accordance with output of said first burst-period cumulative adder;

wherein said frequency of said ramp wave is controlled in accordance with said broadcasting systems by said control signal, wherein said clock is used as said sampling clock.

3. The digital color signal reproducing circuit as described in claim 2 wherein when said broadcasts are based on the NTSC system, said clock pulse is controlled so that the frequency thereof is an integral multiple of the chrominance subcarrier frequency for the NTSC system; and when said broadcasts are based on the PAL system, said clock pulse is practically controlled so that the frequency thereof is substantially the same as the clock frequency for said NTSC system.

4. The digital color signal reproducing circuit as described in claims 2 or 3 wherein said ramp-wave generator is composed of an adder, a latch circuit, and a divider;

said adder adds up said control signal and output signal of said latch circuit;

said latch circuit latches output signal of said adder for output at every said clock pulse; and said divider divides output signal of said adder and supplies a normalized output level of ramp signal.

* * * * *